United States Patent
Deneke

(10) Patent No.: US 11,079,050 B2
(45) Date of Patent: Aug. 3, 2021

(54) BAYONET CONNECTION FOR CONNECTING A CONNECTOR TO A TUBULAR BODY, BAYONET RING, AND TUBULAR BODY

(71) Applicant: Volkswagen Aktiengesellschaft, Wolfsburg (DE)

(72) Inventor: Michael Deneke, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 264 days.

(21) Appl. No.: 16/297,090

(22) Filed: Mar. 8, 2019

(65) Prior Publication Data
US 2019/0203864 A1 Jul. 4, 2019

Related U.S. Application Data

(63) Continuation of application No. PCT/EP2017/070103, filed on Aug. 8, 2017.

(30) Foreign Application Priority Data

Sep. 8, 2016 (DE) .................. 10 2016 217 128.3
Dec. 5, 2016 (DE) .................. 10 2016 224 088.9

(51) Int. Cl.
*F16L 37/248* (2006.01)
*F01N 13/18* (2010.01)
(Continued)

(52) U.S. Cl.
CPC ........ *F16L 37/248* (2013.01); *F01N 13/1811* (2013.01); *F16L 27/1274* (2019.08); *F16L 37/113* (2013.01); *F16L 37/252* (2013.01)

(58) Field of Classification Search
CPC ..... F16L 37/105; F16L 37/107; F16L 37/113; F16L 37/2445; F16L 37/248; F16L 37/252; F16L 27/1274
(Continued)

(56) References Cited

U.S. PATENT DOCUMENTS 1,866,863 A * 7/1932 Richardson ................... 285/401
2,419,702 A * 4/1947 Barnes .................. F16L 37/252
(Continued)

FOREIGN PATENT DOCUMENTS

| CN | 104514930 A | 4/2015 |
| CN | 104662280 A | 5/2015 |

(Continued)

OTHER PUBLICATIONS

Chinese Office Action dated Nov. 2, 2020 in corresponding application 201780055316.2.
(Continued)

*Primary Examiner* — Zachary T Dragicevich
(74) *Attorney, Agent, or Firm* — Muncy, Geissler, Olds & Lowe, P.C.

(57) ABSTRACT

A bayonet joint having a connector with bayonet tabs arranged on the exterior of the connector, a tubular body with at least one external bayonet contour arranged on the exterior of the tubular body and a bayonet ring with inward facing bayonet hooks and at least one inward facing internal bayonet contour. In an assembled state of the bayonet joint, the connector, tubular body and bayonet ring are in a locking orientation relative to one another. The bayonet ring surrounds an outside of the connector and the tubular body in the radial direction and secures the connector and the tubular body against removal from the bayonet ring.

10 Claims, 3 Drawing Sheets

(51) Int. Cl.
*F16L 37/113* (2006.01)
*F16L 27/12* (2006.01)
*F16L 37/252* (2006.01)

(58) Field of Classification Search
USPC .................................................. 285/401, 402
See application file for complete search history.

(56) References Cited

U.S. PATENT DOCUMENTS

| | | | |
|---|---|---|---|
| 2,673,751 | A | 3/1954 | Finch |
| 3,540,762 | A | 11/1970 | Dunlap |
| 4,613,162 | A | 9/1986 | Hughes |
| 6,109,661 | A | 8/2000 | Cwik et al. |
| 9,476,527 | B2 | 10/2016 | Considine et al. |
| 9,982,589 | B2 | 5/2018 | Speidel et al. |
| 10,001,231 | B2 | 6/2018 | Eilert et al. |
| 10,119,504 | B2 | 11/2018 | Kohler |
| 2004/0256096 | A1 | 12/2004 | Adams |
| 2015/0097369 | A1 | 4/2015 | Bernardo |
| 2016/0123511 | A1 | 5/2016 | Khan et al. |
| 2019/0136642 | A1* | 5/2019 | Persent ................. F16L 37/113 |

FOREIGN PATENT DOCUMENTS

| | | |
|---|---|---|
| CN | 105570585 A | 5/2016 |
| CN | 205424176 U | 8/2016 |
| DE | 3901425 A1 | 7/1990 |
| DE | 19943246 A1 | 3/2001 |
| DE | 102004012817 A1 | 10/2005 |
| DE | 102013006955 A1 | 10/2014 |
| DE | 102013210982 A1 | 12/2014 |
| DE | 102013012369 A1 | 1/2015 |
| EP | 1045118 A2 | 10/2000 |
| FR | 347723 A | 3/1905 |
| FR | 12362 E | 9/1910 |
| GB | 2165608 A | 4/1986 |

OTHER PUBLICATIONS

International Search Report dated Nov. 15, 2017 in corresponding application PCT/EP2017/070103.

* cited by examiner

BAYONET CONNECTION FOR CONNECTING A CONNECTOR TO A TUBULAR BODY, BAYONET RING, AND TUBULAR BODY

This nonprovisional application is a continuation of International Application No. PCT/EP2017/070103, which was filed on Aug. 8, 2017, and which claims priority to German Patent Application Nos. 10 2016 217 128.3, which was filed in Germany on Sep. 8, 2016 and 10 2016 224 088.9, which was filed in Germany on Dec. 5, 2016, and which are all herein incorporated by reference.

BACKGROUND OF THE INVENTION

Field of the Invention

The present invention relates to a bayonet joint for joining a connector to a tubular body, a bayonet ring for use in such a bayonet joint, and a tubular body for use in such a bayonet joint.

Description of the Background Art

Bayonet joints are mechanical connections of two cylindrical (tubular) bodies that can be produced and released quickly. The bodies are joined by inserting one into the other and rotating them relative to one another about the longitudinal axis of the bodies. The joint is released by rotating the bodies relative to one another in the opposite direction, or by rotating them further in the same direction, and pulling the bodies apart.

DE 39 01 425 A1 describes such a bayonet joint for vehicle exhaust pipes. The bayonet joint described therein is distinguished, in particular, by great security against unintentional detachment of the connection. However, the two bodies to be joined must be able to be positioned exactly to one another, in particular axially, so that a bayonet catch piece that sits on a first pipe can grip a locking contour of a second pipe.

DE 10 2004 012 817 A1 describes a bayonet joint for pipe sections to be connected to one another. In the case of an axial seal, in particular, the advantage is emphasized that the pipe sections can be attached to one another with no displacement travel. For this purpose, however, the pipe sections must already have sufficiently precise positioning relative to one another prior to assembly.

In the event that a connector is being joined to a tubular body, further demands may be placed on a bayonet joint when the connector and the tubular body are each already rigidly arranged on a component prior to creation of the bayonet joint. In particular, as a result of positional tolerances of the components relative to one another, or as a result of component tolerances of the connector or of the tubular body, different relative positions of the connector and tubular body with respect to one another may arise depending on the positions in the tolerance zone. A change in alignment of the connector to the tubular body in order to produce the bayonet joint is then not permitted by the rigid arrangement on other components. If the choice of the design of the bayonet joint requires a sufficiently precise position of the connector relative to the tubular body in order to produce the bayonet joint, the production of the bayonet joint can be prevented in unfavorable tolerance zone positions. If the proportion of these possible impermissible tolerance zone positions is too high for the cost effectiveness of the product, other connection types must then be chosen or stringent requirements must be placed on the positional and dimensional tolerances, which in turn entails higher costs.

SUMMARY OF THE INVENTION

It is therefore an object of the present invention to provide a bayonet joint that can compensate for deviations in position of the connector to be joined and of the tubular body.

A bayonet joint according to an exemplary embodiment of the invention for joining a connector to a tubular body has a connector. Bayonet tabs are arranged on the exterior of the connector. The tubular body has at least one external bayonet contour arranged on the exterior of the tubular body. The bayonet joint additionally has a bayonet ring, wherein the bayonet ring has inward facing bayonet hooks and at least one inward facing internal bayonet contour. In an assembled state of the bayonet joint, the connector, tubular body, and bayonet ring are in a locking orientation relative to one another. In this state, the bayonet ring surrounds the connector and the tubular body on the outside in the radial direction, and secures the connector and the tubular body against removal from the bayonet ring. This retention is achieved on the one hand by the means that the bayonet tabs and the bayonet hooks achieve a positive engagement that opposes removal of the connector, and on the other hand the external bayonet contour and the internal bayonet contour achieve a positive engagement that opposes removal of the tubular body.

The bayonet ring can have a plurality of internal bayonet contours that are essentially identical geometrically, and are arranged in multiple planes perpendicular to the central axis of the bayonet ring. Alternatively, the tubular body has a plurality of external bayonet contours that are essentially identical geometrically, and are arranged in multiple planes perpendicular to the central axis of the tubular body.

At least in the region of the bayonet joint, the connector is a body with a tube-like shape, which is to say that the connector has, in the region of the bayonet joint, a cylindrically shaped wall that has an external diameter and an internal diameter. The connector is suitable for conducting a fluid in this respect. Arranged on the exterior of the connector are bayonet tabs. The bayonet tabs can be implemented in the form of a flange, which does not extend around the entire perimeter of the connector, however, but instead is interrupted at one or more points in a segmented manner. The bayonet tabs can be implemented as a single piece with the connector, or else as a body that is joined to the connector.

At least in the region of the bayonet joint, the tubular body is tubular in design. Provision can be made that the tubular body transitions into another, non-tubular contour outside the region of the bayonet joint. In the region of the bayonet joint, the tubular body is implemented as a cylindrically shaped wall that has an external diameter and an internal diameter. The tubular body is suitable for conducting a fluid in this respect. The tubular body can have an internal diameter that is chosen to be larger than the external diameter of the connector so that the tubular body can be passed over the end of the connector for the purpose of joining the connector and tubular body. In other words, the connector can be inserted at least partially into the tubular body as a result.

On the exterior of the tubular body, at least external bayonet contour is arranged. An external bayonet contour refers here to a contour that extends in the manner of a flange, and preferably with rotational symmetry about the central axis of the tubular body, in the region of the bayonet joint. In order to be suitable for a bayonet joint, the external bayonet contour must be interrupted in at least one segment over the perimeter of the external bayonet contour. In this segment, accordingly, no external bayonet contour is present or, alternatively, a contour with a smaller maximum external diameter is present. In one embodiment, the external bayonet contour can be interrupted in multiple segments. The external bayonet contour can be implemented as a single piece with the tubular body, or alternatively as a component that is joined to the tubular body.

The bayonet ring is a body with an at least partially tube-like shape, and accordingly has a wall that is partially cylindrical in shape and that has an internal diameter and an external diameter. The internal diameter of the tube-like section of the bayonet ring can have an internal diameter that is chosen to be larger than the external diameter of the tubular body so that the bayonet ring can be pushed at least partially over the tubular body. Bayonet hooks are formed or arranged on the bayonet ring. The bayonet hooks are inward facing and have a smallest internal diameter that is chosen to be smaller than the largest external diameter of the bayonet tabs of the connector. The bayonet hooks preferably are designed to be largely rotationally symmetric, wherein they do not extend around the entire perimeter in the manner of a flange, however. The bayonet hooks accordingly are interrupted in one or more segments. This means that the bayonet hooks have a smallest internal diameter in these segments that is chosen to be larger than the largest external diameter of the bayonet tabs of the connector. The bayonet hooks can be designed as the negative of the interrupted segments of the bayonet tabs of the connector. For example, if the bayonet tabs are interrupted in two segments over one selected angular region apiece, the bayonet hooks could be implemented only in corresponding angular regions while the bayonet hooks are interrupted in the other segments. Provision can be made that the angular regions of the fully formed segments of the bayonet hooks are smaller than the angular regions of the interrupted segments of the bayonet tabs so that shape and positional tolerances of the components are acceptable.

The described design of the bayonet hooks and bayonet tabs, and also the diameters of the bayonet ring, the tubular body, and the connector, make it possible that the tubular body can be pushed at least partially over the connector. The bayonet ring, in turn, can then be pushed over the tubular body and thus also over the connector. During this process, the bayonet hooks can be pushed through the interrupted segments of the bayonet tabs. This means that the bayonet hooks can be positioned on the side of the bayonet tabs facing away from the tubular body. By means of a rotation of the bayonet ring about the then coaxial central axes of the connector, of the tubular body, and of the bayonet ring, the bayonet hooks behind the bayonet tabs—viewed axially—can be pivoted out of the interrupted segments of the bayonet tabs and behind the fully formed segments of the bayonet tabs. As a result, a positive-locking connection of the bayonet ring with the connector can be provided that opposes displacement of the bayonet ring in the direction of the tubular body, which is to say that opposes a removal of the bayonet ring from the connector.

The bayonet ring according to the invention additionally has at least one inward facing internal bayonet contour. An internal bayonet contour refers here to a contour that extends in the manner of a flange, and preferably with rotational symmetry, about the central axis of the bayonet ring. In order to be suitable for a bayonet joint, the internal bayonet contour must be interrupted in at least one segment over the perimeter of the internal bayonet contour. In this segment, accordingly, no internal bayonet contour is present or, alternatively, a contour with a larger minimum internal diameter is present. In one embodiment, the internal bayonet contour can be interrupted in multiple segments. The internal bayonet contour can be implemented as a single piece with the bayonet ring, or alternatively as a component that is joined to the bayonet ring. The internal bayonet contour is inward facing and has a smallest internal diameter that is chosen to be smaller than the largest external diameter of the external bayonet contour of the tubular body. The internal bayonet contour preferably is designed to be largely rotationally symmetric, wherein it does not extend around the entire perimeter in the manner of a flange, however. The internal bayonet contour accordingly is interrupted in one or more segments. This means that the internal bayonet contour has a smallest internal diameter in these segments that is chosen to be larger than the largest external diameter of the external bayonet contour of the tubular body. The internal bayonet contour can be designed as the negative of the external bayonet contour of the tubular body. For example, if the external bayonet contour is interrupted in two segments over one selected angular region apiece, the internal bayonet contour could be fully implemented only in corresponding angular regions while the internal bayonet contour is interrupted in the other segments. Provision can be made that the angular regions of the fully formed segments of the internal bayonet contour are smaller than the angular regions of the interrupted segments of the external bayonet contour so that shape and positional tolerances of the components are acceptable.

The described design of the bayonet hooks and bayonet tabs, and also the diameters of the bayonet ring, the tubular body, and the connector, make it possible that the tubular body can be pushed at least partially over the connector. The bayonet ring, in turn, can then be pushed over the tubular body and thus also over the connector. During this process, the internal bayonet contour can be pushed through the interrupted segments of the external bayonet contour. By means of a rotation of the bayonet ring about the then coaxial central axes of the connector, of the tubular body, and of the bayonet ring, the fully formed segments of the internal bayonet contour behind the external bayonet contour—viewed axially—can be pivoted behind the fully formed segments of the external bayonet contour. As a result, a positive-locking connection of the bayonet ring with the tubular body can be provided that opposes displacement of the bayonet ring in the direction of the connector, which is to say that opposes a removal of the bayonet ring from the tubular body.

Provision can be made that the bayonet ring can already be arranged on the connector or on the tubular body before the mating of the tubular body and the connector. Then provision can be made that the internal bayonet contour is arranged behind the external bayonet contour, when viewed axially, even before the mating of the tubular body and the connector, or that the bayonet hooks are arranged behind the bayonet tabs, when viewed axially, even before the mating of the tubular body and the connector.

The bayonet ring can have a plurality of internal bayonet contours that are essentially identical geometrically, and are arranged in multiple planes perpendicular to the central axis of the bayonet ring. In accordance with the invention, the bayonet ring accordingly has at least two internal bayonet contours that are essentially identical geometrically. The internal bayonet contours in this design are arranged in multiple planes that are perpendicular to the central axis of the bayonet ring and that are spaced axially apart from one another with respect to the central axis of the bayonet ring. According to the invention, it is made possible by this means that the bayonet joint can be produced in multiple axial positions of the bayonet ring with respect to the tubular body. Depending on the axial position of the bayonet ring with respect to the tubular body, in this design only one internal bayonet contour behind the external bayonet contour is in contact with the same. As a result of the fact that multiple internal bayonet contours are provided, the bayonet joint always has a slight axial play in the positive-locking connection in various axial positions of the bayonet ring, whereas a bayonet joint from the prior art with just one internal bayonet contour would either have great axial play or could not be produced at all, depending on the axial position of the bayonet ring. Deviations in position of the bayonet ring with respect to the tubular body caused by shape and positional tolerances of the components can thus be compensated for in accordance with the invention, wherein slight axial play of the bayonet joint is ensured.

The internal bayonet contours can be oriented the same way with regard to their fully formed segments and their interrupted segments, so that the bayonet ring can be pushed over the external bayonet contour in the same rotational orientation, wherein multiple internal bayonet contours are pushed over the external bayonet contour. It is additionally preferred for the planes in which the internal bayonet contours are arranged to be spaced apart such that the axial, free space between two adjacent internal bayonet contours corresponds to at least the axial extent of the external bayonet contour. Provision can be made when there are three or more internal bayonet contours that the internal bayonet contours are arranged to be axially equidistant, which is to say that the planes in which the internal bayonet contours are arranged have axially equidistant spacing.

The bayonet ring can have just one internal bayonet contour, while the tubular body has a plurality of external bayonet contours that are essentially identical geometrically, and are arranged in multiple planes perpendicular to the central axis of the tubular body. In accordance with the invention, the tubular body accordingly has at least two external bayonet contours that are essentially identical geometrically. The external bayonet contours in this design are arranged in multiple planes that are perpendicular to the central axis of the tubular body and that are spaced axially apart from one another with respect to the central axis of the tubular body. According to the invention, it is also made possible by this means that the bayonet joint can be produced in multiple axial positions of the bayonet ring with respect to the tubular body. Depending on the axial position of the bayonet ring with respect to the tubular body, in this design the internal bayonet contour is in contact with the external bayonet contours behind only one of the same. As a result of the fact that multiple external bayonet contours are provided, the bayonet joint always has a slight axial play in the positive-locking connection in various axial positions of the bayonet ring, whereas a bayonet joint from the prior art with just one external bayonet contour would either have great axial play or could not be produced at all, depending on the axial position of the bayonet ring. Deviations in position of the bayonet ring with respect to the tubular body caused by shape and positional tolerances of the components can thus be compensated for in accordance with the invention, wherein slight axial play of the bayonet joint is ensured.

The external bayonet contours can be oriented the same way with regard to their fully formed segments and their interrupted segments, so that the bayonet ring can be pushed over multiple external bayonet contours in the same rotational orientation. It is additionally preferred for the planes in which the external bayonet contours are arranged to be spaced apart such that the axial, free space between two adjacent external bayonet contours corresponds to at least the axial extent of the internal bayonet contour. Provision can be made when there are three or more external bayonet contours that the external bayonet contours are arranged to be axially equidistant, which is to say that the planes in which the external bayonet contours are arranged have axially equidistant spacing.

Provision is advantageously made that the bayonet ring has a plurality of internal bayonet contours and the tubular body also has a plurality of external bayonet contours. Due to this advantageous embodiment of the bayonet joint, the region of the axial orientation of the tubular body to the bayonet ring in which a joint is allowed can be further enlarged. In addition, it can also be made possible by this means to make the external bayonet contours and/or the internal bayonet contours smaller, which is to say to design them with a smaller load capacity of an individual contour, when the external bayonet contours and the internal bayonet contours are axially arranged such that multiple external bayonet contours come into contact with multiple internal bayonet contours in the permissible axial positions of the tubular body. Here, too, the planes in which the external bayonet contours are arranged preferably are spaced apart such that the axial, free space between adjacent external bayonet contours corresponds to at least the axial extent of one internal bayonet contour, while the planes in which the internal bayonet contours are arranged are spaced apart such that the axial, free space between adjacent internal bayonet contours corresponds to at least the axial extent of one external bayonet contour. Provision can be made that, when there are three or more internal bayonet contours, the internal bayonet contours are arranged to be axially equidistant, which is to say that the planes in which the internal bayonet contours are arranged have axially equidistant spacing.

The bayonet joint can be designed such that the internal bayonet contour is rotationally symmetric to the central axis of the bayonet ring, and the external bayonet contour is rotationally symmetric to the central axis of the tubular body. As a result of such an embodiment, simple manufacturability of the contours and also simple rotation of the bayonet ring with respect to the tubular body are ensured.

If the internal bayonet contour and the external bayonet contour are implemented fully in two angular segments apiece, this represents a good compromise between the number of segments to be produced and the durability of the joint. Furthermore, a large angular region with respect to the rotational orientation of the bayonet ring is provided hereby, in which region an internal bayonet contour is in contact axially behind an external bayonet contour.

The connector can have a seal on its outer circumference. The seal can be implemented, in particular, as a sealing ring that is placed in a groove in the outer circumference of the connector in a positive-locking manner. If the tubular body is pushed over the connector when the bayonet joint is produced, the seal is in contact with the inner circumference of the tubular body and with the outer circumference of the connector. The interior of the connector and tubular body, which is suitable for a fluid to flow through, is then sealed against the environment of the bayonet joint.

The internal bayonet contour can be implemented as a single piece with the bayonet ring, and the external bayonet contour can be implemented as a single piece with the tubular body. As a result, good durability of the bayonet joint and simple manufacturability of the components thereof are achieved.

A bayonet ring for use in a bayonet joint according to the invention can have inward facing bayonet hooks and a plurality of inward facing internal bayonet contours that are essentially identical geometrically and are arranged in multiple planes perpendicular to the central axis of the bayonet ring.

A tubular body for use in a bayonet joint according to the invention can have a plurality of external bayonet contours arranged on the exterior of the tubular body that are essentially identical geometrically, and are arranged in multiple planes perpendicular to the central axis of the tubular body.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
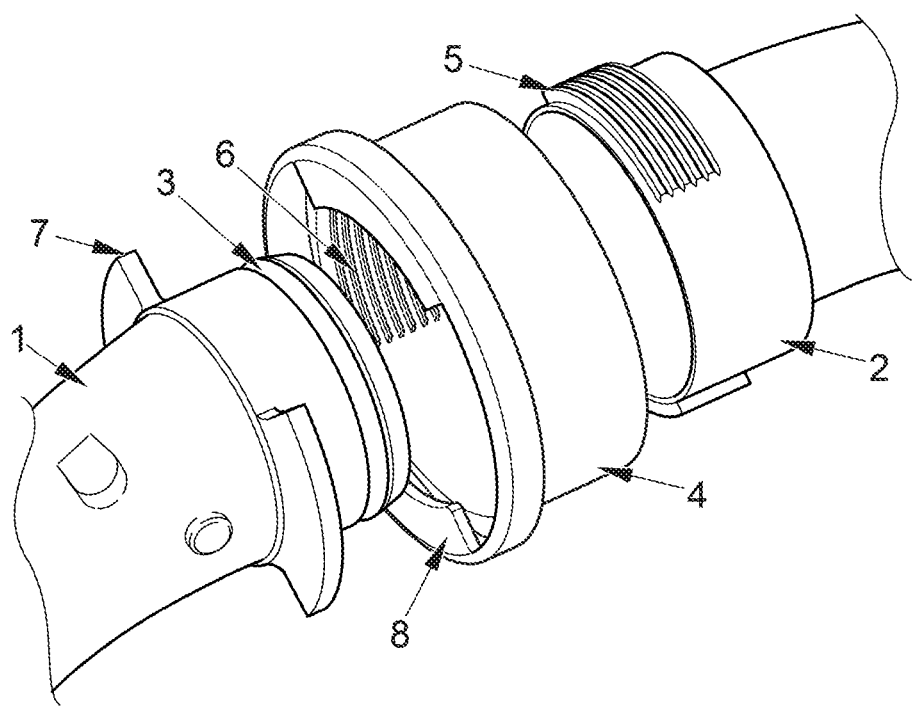
FIG. 1 is a perspective view of an exemplary embodiment of a bayonet joint according to the invention in the unjoined state.

FIG. 1 shows a perspective view of an embodiment of a bayonet joint according to the invention in the unjoined state. A connector 1, which constitutes the tubular outlet of a compressor of an exhaust turbocharger of an internal combustion engine, has two bayonet tabs 7 that extend radially outward. The bayonet tabs 7 are rotationally symmetric about the central axis of the connector 1, and are implemented in two angular segments, which is to say that the bayonet tabs 7 do not surround the entire perimeter of the connector 1. The connector 1 is intended to be joined to the end of a tubular body 2, implemented as a pressure pipe of the internal combustion engine.

The tubular body 2 can be implemented as a pressure pipe serves to carry compressed fresh air downstream of the compressor towards the combustion chambers of the internal combustion engine. The tubular body 2 has an internal diameter that is dimensioned such that the tubular body 2 can surround the connector 1 in the radial direction when the tubular body 2 and connector 1 are mated. The tubular body 2 has at least two planes of external bayonet contours 5 that extend radially outward from the tubular body 2 and are implemented as a single piece with the tubular body 2. FIG. 1 shows six planes of external bayonet contours 5. The external bayonet contours 5 are rotationally symmetric about the central axis of the tubular body 2 and are implemented in two angular segments, which is to say that the external bayonet contours 5 do not surround the entire perimeter of the tubular body 2.

A seal 3 is arranged in a radially outward facing groove in the connector 1. When the tubular body 2 radially surrounds the connector 1, the seal 3 is in contact with the inner surface of the tubular body 2 so that the connection point is sealed. To secure the joint, a bayonet ring 4 is provided. The bayonet ring 4 is larger than connector 1 and tubular body 2 in terms of diameter, so that it can be guided around the outside of the connection point of connector 1 and tubular body 2. The bayonet ring 4 has bayonet hooks 8 that correspond with the bayonet tabs 7. The bayonet hooks 8 are rotationally symmetric about the central axis of the bayonet ring 4 and are implemented in two angular segments. In this case the segments of the bayonet hooks 8 and the segments of the bayonet tabs 7 are designed such that, in a mating orientation of the bayonet ring 4 and the connector 1 in which the central axes of the connector 1 and bayonet ring 4 are coaxial, the bayonet hooks 8 can be passed through the free spaces left by the segments of the bayonet tabs 7 when the bayonet ring 4 is moved toward the connector 1.

In addition, the bayonet ring 4 has at least two planes of internal bayonet contours 6 that extend radially inward from the bayonet ring 4 and are implemented as a single piece with the bayonet ring 4. FIG. 1 shows ten planes of internal bayonet contours 6. The internal bayonet contours 6 are rotationally symmetric about the central axis of the bayonet ring 4 and are implemented in two angular segments, which is to say that the internal bayonet contours 6 are not implemented as solids of revolution around the entire perimeter. The internal bayonet contours 6 correspond with the external bayonet contours 5. The segments of the internal bayonet contours 6 and the segments of the internal bayonet contours 5 are designed such that, in a mating orientation of the bayonet ring 4 and the tubular body 2 in which the central axes of the tubular body 2 and bayonet ring 4 are coaxial, at least one of the internal bayonet contours 6 can be passed through the free spaces left by the segments of at least one of the external bayonet contours 5 when the bayonet ring 4 is moved toward the tubular body 2 or when the tubular body 2 is moved toward the bayonet ring 4.

Figure 2:
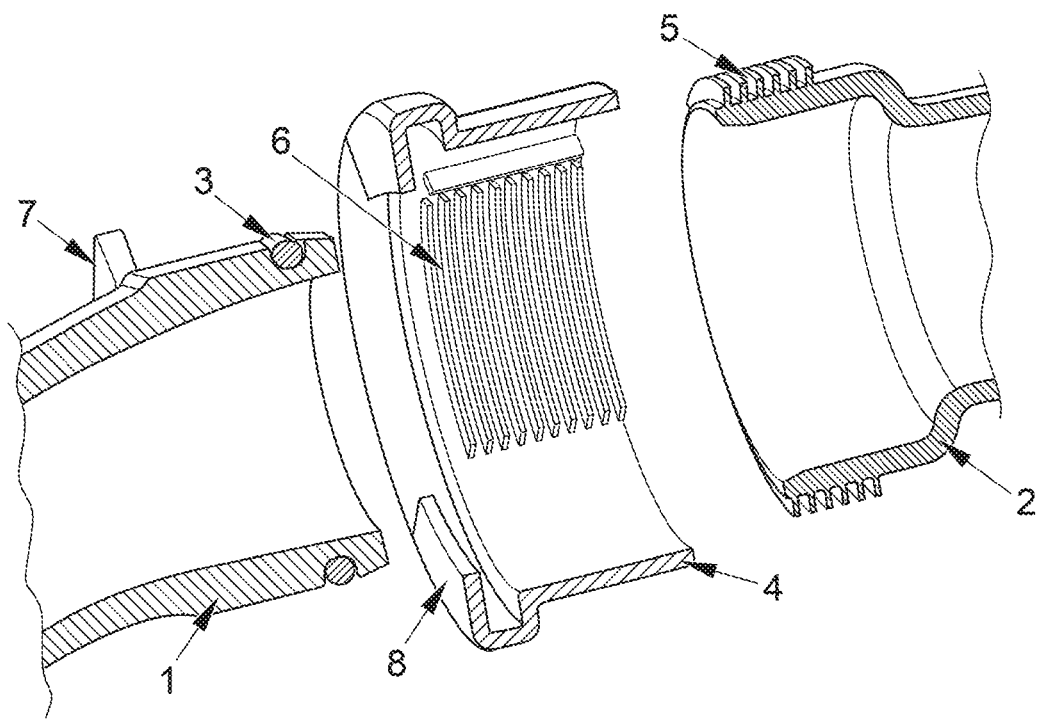
FIG. 2 is a cross-section through the representation from FIG. 1 along a plane through the central axis of the bayonet ring.

This mating orientation of bayonet ring 4, connector 1, and tubular body 2 is shown in FIG. 1 in a perspective view. FIG. 2 is a cross-sectional representation of the arrangement from FIG. 1, wherein like entities are labeled with identical reference symbols, and are not described again.

Figure 3:
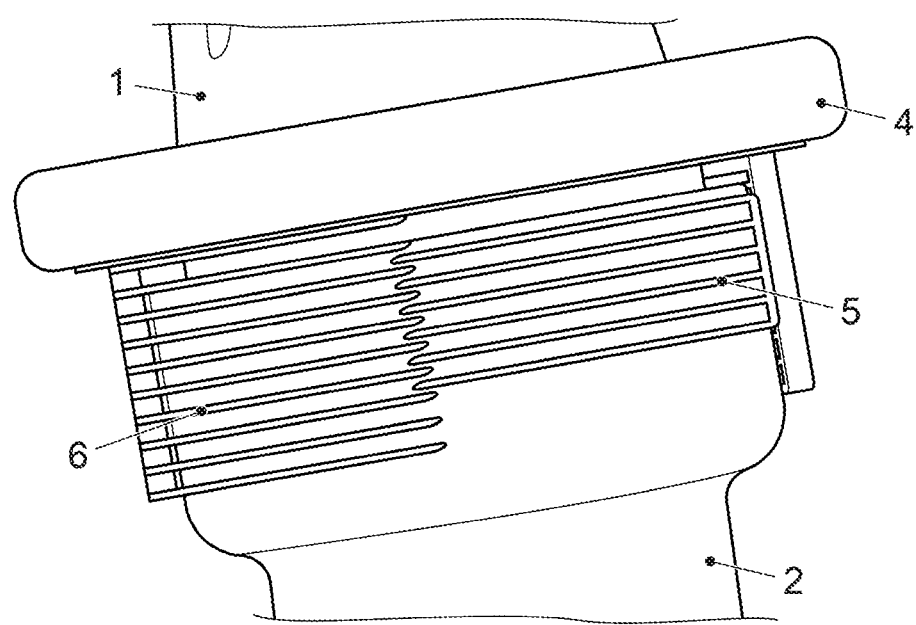
FIG. 3 is a perspective view of the embodiment of the bayonet joint according to the invention in a state between the unjoined and joined states.

FIG. 3 shows the transition from the mating orientation to the locking orientation of the arrangement formed of bayonet ring 4, connector 1, and tubular body 2. When the bayonet ring 4, connector 1, and tubular body 2 have been pushed together along their central axes, the bayonet ring 4 is rotated in order to lock the arrangement. During this rotation, the bayonet hooks 8 are located behind the bayonet tabs 7 with respect to the joining direction of the bayonet joint (which is to say on the side of the bayonet tabs 7 facing away from the tubular body 2), so that a positive engagement is created that opposes pulling apart of the bayonet ring 4 and connector 1. At the same time, during this rotation at least one of the internal bayonet contours 6 is arranged behind at least one of the external bayonet contours 5 with respect to the joining direction of the bayonet joint (which is to say on the side of at least one of the external bayonet contours 5 facing away from the connector 1), so that a positive engagement is formed that opposes pulling apart of the bayonet ring 4 and tubular body 2. FIG. 3 shows the start of the rotational motion. In particular, how the internal bayonet contours 6 are threaded in behind the external bayonet contours 5 in the joining direction can be seen in FIG. 3. In FIG. 3, part of the body of the bayonet ring 4 is not shown, so that the internal bayonet contours 6 and the tubular body 2 can be seen. When the rotation is continued, the overlap of the internal bayonet contours 6 and external bayonet contours 5, and the load capacity of the joint, are increased.

Figure 4:
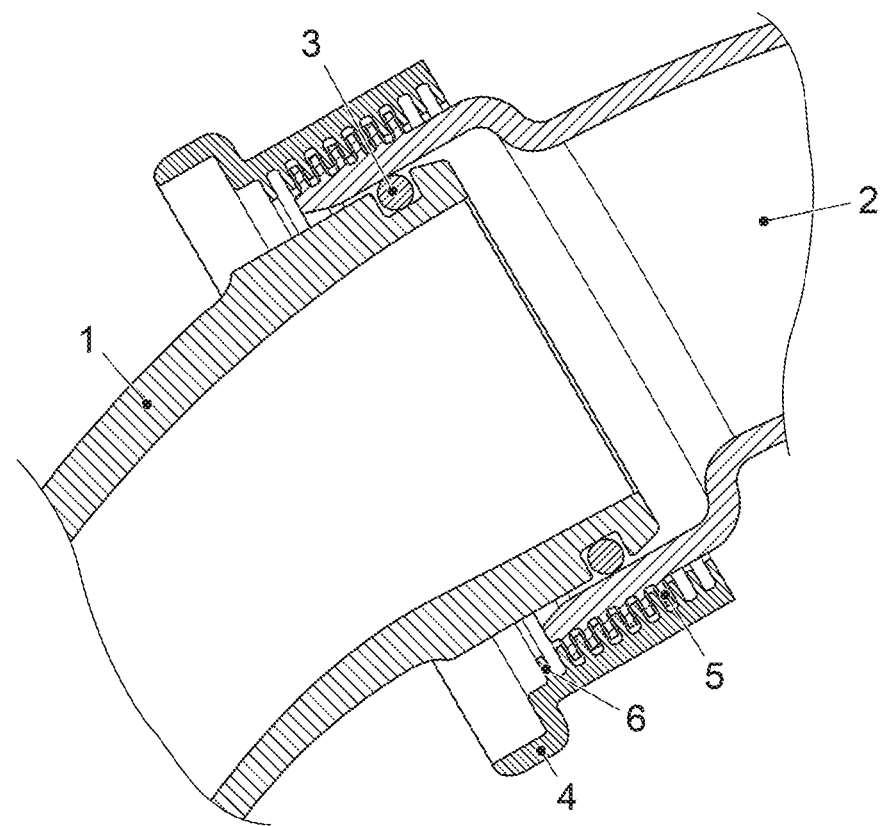
FIG. 4 is a cross-sectional view of the embodiment of the bayonet joint according to the invention in the joined state along a plane through the central axis of the bayonet ring.

FIG. 4 is a cross-sectional representation of the arrangement formed of bayonet ring 4, connector 1, and tubular body 2 in the locked state of the bayonet joint. The six external bayonet contours 5 are located between the ten internal bayonet contours 6, and consequently create a positive engagement in the joining direction. It can be seen that the external bayonet contours 5 are located approximately in the center with respect to the entirety of internal bayonet contours 6.

Figure 5:
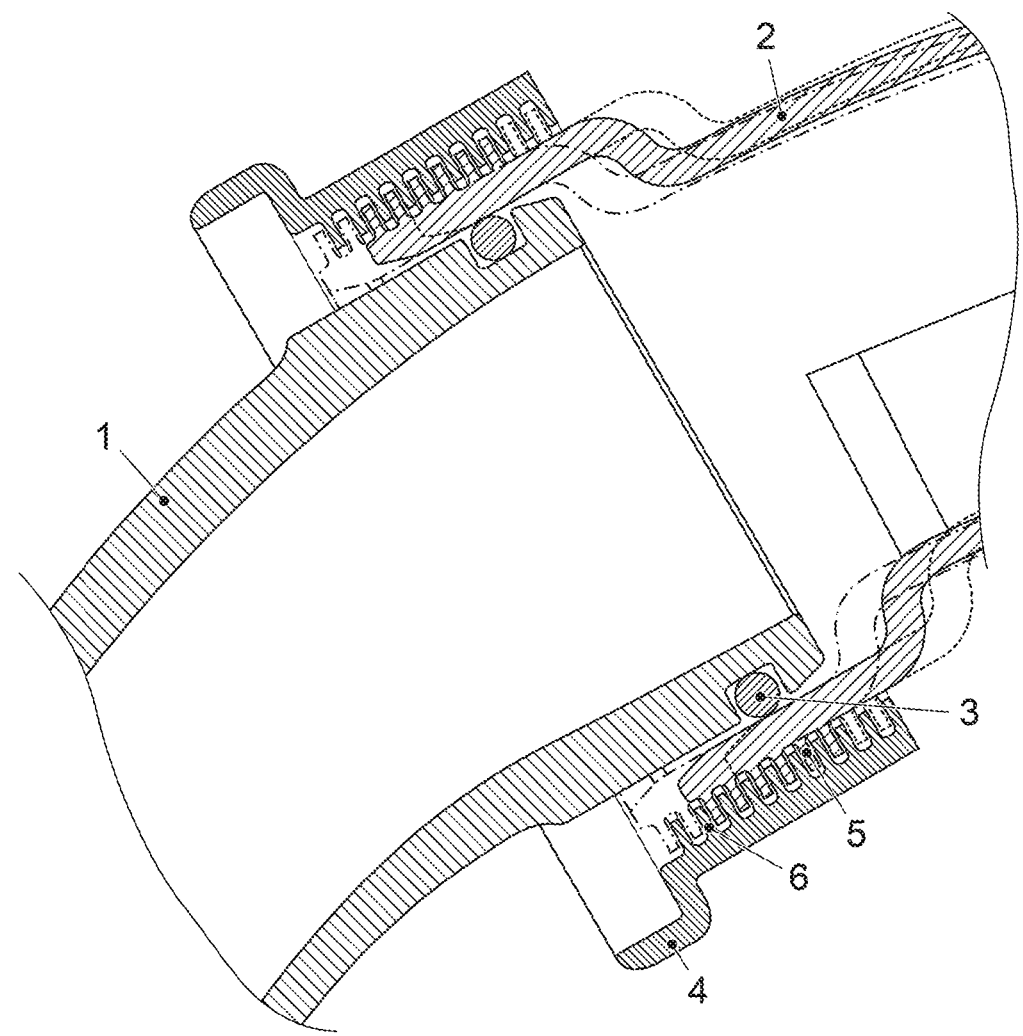
FIG. 5 is a cross-sectional view of the embodiment of the bayonet joint according to the invention along a plane through the central axis of the bayonet ring, wherein multiple joining states are shown on the basis of different axial positions of the tubular body.

According to the invention, the proposed bayonet joint can compensate for tolerance deviations with regard to the position of a tubular body 2 relative to the connector 1. For this purpose, provision is made, as can be seen in FIG. 4, that the tubular body 2 can even be joined to the connector 1 by means of the bayonet joint according to the invention when the tubular body 2 cannot be pushed as far over the connector 1 as in FIG. 4. In this case, the external bayonet contours 5 would be located further to the right (in the direction of the tubular body 2) in the entirety of internal bayonet contours 6. This is represented in FIG. 5, which shows the cross-section as in FIG. 4 with two additionally illustrated positions of the tubular body 2 that differ from the position in FIG. 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bayonet joint comprising:
a connector having at least one bayonet tab arranged on an exterior of the connector;
a tubular body having at least one external bayonet contour arranged on an exterior of the tubular body; and
a bayonet ring with inward facing bayonet hooks and at least one inward facing internal bayonet contour,
wherein, in an assembled state of the bayonet joint in which the connector, tubular body, and bayonet ring are in a locking orientation relative to one another, the bayonet ring surrounds the connector and the tubular body on an outside in a radial direction, and secures the connector and the tubular body against removal from the bayonet ring via a positive engagement of the at least one bayonet tab and the bayonet hooks to oppose removal of the connector, and via a positive engagement of the at least one external bayonet contour and the at least one internal bayonet contour to oppose removal of the tubular body, and
wherein the at least one internal bayonet contour of the bayonet ring includes a plurality of internal bayonet contours that are identical geometrically and are arranged in multiple planes substantially perpendicular to the central axis of the bayonet ring, with each of the plurality of internal bayonet contours being separate and discrete from one another, or the at least one external bayonet contour of the tubular body includes a plurality of external bayonet contours that are identical geometrically and are arranged in multiple planes substantially perpendicular to the central axis of the tubular body, with each of the plurality of external bayonet contours being separate and discrete from one another.

2. The bayonet joint according to claim 1, wherein both the bayonet ring has the plurality of internal bayonet contours and the tubular body has the plurality of external bayonet contours.

3. The bayonet joint according to claim 2, wherein the plurality of internal bayonet contours are rotationally symmetric to the central axis of the bayonet ring, and wherein the plurality of external bayonet contours are rotationally symmetric to the central axis of the tubular body.

4. The bayonet joint according to claim 3, wherein the plurality of internal bayonet contours and the plurality of external bayonet contours are implemented in two angular segments apiece.

5. The bayonet joint according to claim 2, wherein the plurality of internal bayonet contours are implemented as a single piece with the bayonet ring, and wherein the plurality of external bayonet contours are implemented as a single piece with the tubular body.

6. The bayonet joint according to claim 1, wherein the tubular body radially surrounds portions of the connector in the assembled state of the bayonet joint.

7. The bayonet joint according to claim 6, wherein the connector has a seal on an outer circumference.

8. The bayonet joint according to claim 1, wherein the at least one bayonet tab projects outward from the exterior of the connector in a radial direction.

9. The bayonet joint according to claim 1, wherein rotation of the bayonet ring causes the bayonet joint to change from the locking orientation to an unlocked orientation, and wherein the tubular body and the bayonet ring remain in a same axial position with respect to one another during the rotation of the bayonet ring.

10. A bayonet joint comprising:
a connector having at least one bayonet tab arranged on an exterior of the connector;
a tubular body having at least one external bayonet contour arranged on an exterior of the tubular body; and
a bayonet ring with inward facing bayonet hooks and at least one inward facing internal bayonet contour,
wherein, in an assembled state of the bayonet joint in which the connector, tubular body, and bayonet ring are in a locking orientation relative to one another, the bayonet ring surrounds the connector and the tubular body on an outside in a radial direction, and secures the connector and the tubular body against removal from the bayonet ring via a positive engagement of the at least one bayonet tab and the bayonet hooks to oppose removal of the connector, and via a positive engagement of the at least one external bayonet contour and the at least one internal bayonet contour to oppose removal of the tubular body, wherein the at least one internal bayonet contour of the bayonet ring includes a plurality of internal bayonet contours that are identical geometrically and are arranged in multiple planes substantially perpendicular to the central axis of the bayonet ring and the at least one external bayonet contour of the tubular body includes a plurality of external bayonet contours that are identical geometrically and are arranged in multiple planes substantially perpendicular to the central axis of the tubular body, and wherein the plurality of internal bayonet contours do not extend around an entire internal circumference of the bayonet ring and wherein the plurality of external bayonet contours do not extend around an entire external circumference of the tubular body.

\* \* \* \* \*